No. 725,579. PATENTED APR. 14, 1903.
R. G. MORRIS.
ANIMAL POKE.
APPLICATION FILED OCT. 22, 1902.
NO MODEL. 2 SHEETS—SHEET 1.
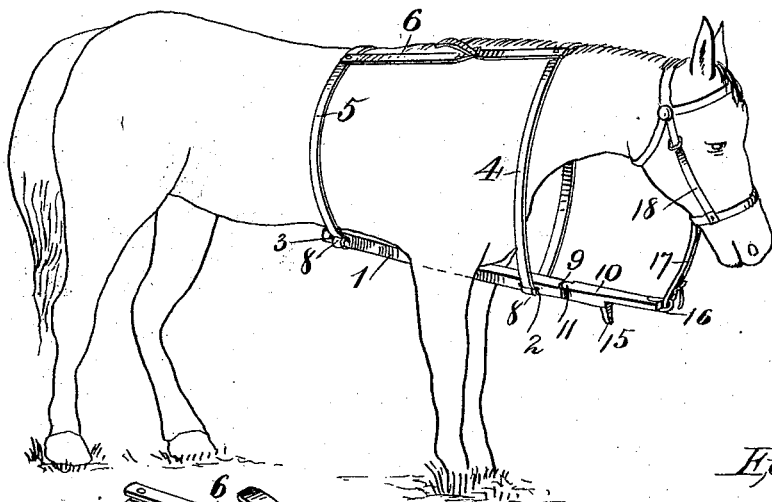
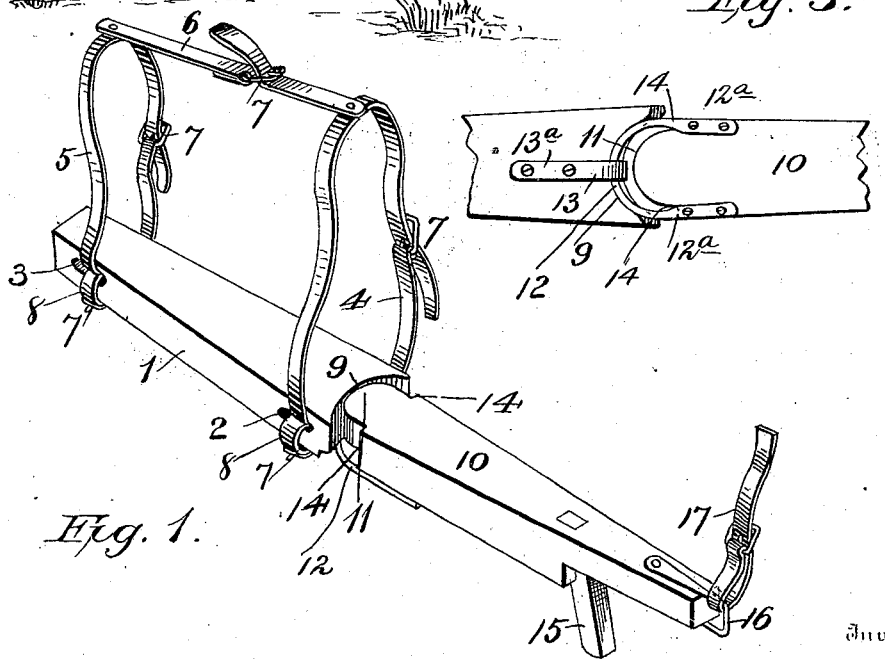

No. 725,579. PATENTED APR. 14, 1903.
R. G. MORRIS.
ANIMAL POKE.
APPLICATION FILED OCT. 22, 1902.
NO MODEL. 2 SHEETS—SHEET 2.

Witnesses
F. L. Ourand.
Frank G. Radelfinger.

Inventor
R. G. Morris.
By Lewis Bagger & Co.,
Attorneys

UNITED STATES PATENT OFFICE.

ROLIN G. MORRIS, OF GRICE, TEXAS.

ANIMAL-POKE.

SPECIFICATION forming part of Letters Patent No. 725,579, dated April 14, 1903.

Application filed October 22, 1902. Serial No. 128,284. (No model.)

*To all whom it may concern:*

Be it known that I, ROLIN G. MORRIS, a citizen of the United States, residing at Grice, in the county of Upshur and State of Texas, have invented new and useful Improvements in Animal-Pokes, of which the following is a specification.

My invention relates to animal-pokes, and has three objects—first, to prevent stock from jumping; second, to prevent them from injuring themselves on wire fences, and, third, to prevent calves and colts from nursing.

The simple and novel construction employed by me in carrying out my invention is fully described in this specification and claimed, and illustrated in the accompanying drawings, forming a part thereof, in which—

Figure 4:
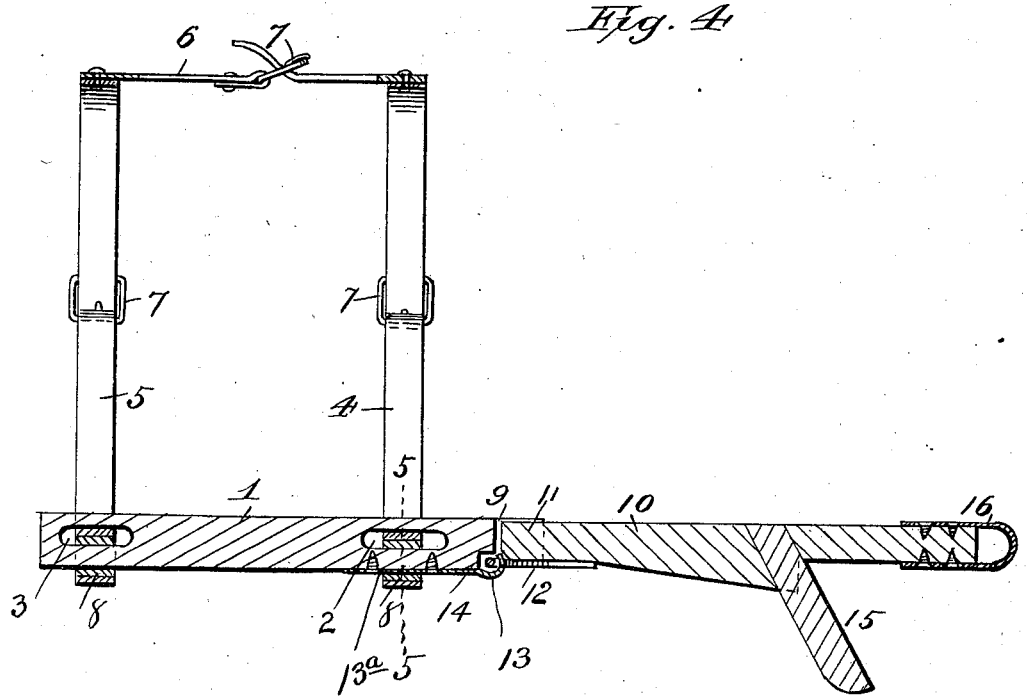
Figure 5:
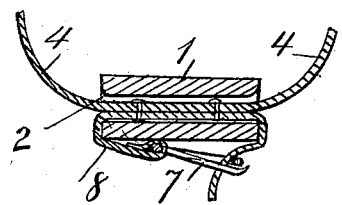

Figure 1 is a perspective of my device. Fig. 2 is a side view of a horse with my poke on. Fig. 3 is a fragmentary bottom plan view. Fig. 4 is a longitudinal section of my poke. Fig. 5 is a section on the line 5 5, Fig. 4.

Like numerals of reference designate like parts in the different views of the drawings.

The numeral 1 designates the supporting-bar of my device, which is apertured transversely at 2 and 3 to accommodate a neckband 4 and a belly-band 5, respectively, which are connected by a back-band 6, all of which bands are provided with buckles 7. Straps 8, also passing through the apertures 2 and 3 and secured by buckles 7, serve to keep the bands 4 and 5 from slipping.

The forward end of the supporting-bar 1 is hollowed out at 9 to accommodate the rounded rear end 11 of a poke-bar 10. A U-iron 12 is rigidly secured by its apertured arms 12ª to the under side of the poke-bar 10 and projects beyond the rounded end 11 thereof in position to engage a guide-hook 13, bearing an apertured shank 13ª, which is secured by screws to the under side of the bar 1. Shoulders 14 are formed on the bar 10 and serve as stops to limit the sidewise swing of the poke-bar 10. The upward movement of the bar 10 is limited by the rounded end thereof. A downwardly and forwardly inclined projection 15 is formed on the bar 10 and serves as a catch to engage the wires of a fence to keep an animal from forcing its way through. A U-iron 16 is secured to the forward end of the bar 10 to serve as an attachment for a strap 17 for use in fastening this end to the chin-strap of a headstall or halter 18.

When in use, my poke is put on an animal in the manner shown in Fig. 2, with the bar 1 extending along the breast and between the fore legs. The bands 4 and 5 are passed around the neck and belly, respectively, to secure the bar 1 in place. The strap 17 is attached to the headstall 18 to hold up the forward end of the poke-bar 10.

I do not wish to be limited as to details of construction, as these may be modified in many particulars without departing from the spirit of my invention.

Having described my invention, what I claim as new, and desire to secure by Letters Patent, is—

1. In an animal-poke, the combination of a supporting-bar, means for securing said bar between the fore legs of an animal, a poke-bar hinged to said supporting-bar, and bearing a downwardly and forwardly inclined projection, mounted on the under side to serve to engage the wire of a fence to keep the animal from forcing its way through by spreading the wires, and means for securing the free end of said poke-bar to the head of said animal, substantially as described.

2. In an animal-poke, the combination of a supporting-bar constructed to extend between the fore legs of an animal, means for securing said bar in place, a guide-hook mounted on the forward end of said bar, a poke-bar bearing a U-shaped iron engaged by said guide, the arms of said U being rigidly secured to the under side of said bar, the abutting ends of said bars being shaped to limit the upward movement of said poke-bar, and means for securing the forward end of said poke-bar to the head of an animal, substantially as described.

In testimony whereof I have hereunto set my hand in presence of two subscribing witnesses.

ROLIN G. MORRIS.

Witnesses:
W. L. DENTON,
D. A. BIRD.